137-861 3R

OR RE 28,968

United States

Dove

Re. 28,968

MD

Sept. 21, 1976

[54] STEAM SUPPLY APPARATUS

[75] Inventor: Norman F. Dove, Cranbrook, Canada

[73] Assignee: Devron Engineering Ltd., Vancouver, Canada

[22] Filed: Dec. 5, 1974

[21] Appl. No.: 529,619

Related U.S. Patent Documents

Reissue of:

[64] Patent No.: 3,777,781
Issued: Dec. 11, 1973
Appl. No.: 300,490
Filed: Oct. 25, 1972

[30] Foreign Application Priority Data

Apr. 21, 1972 Canada ..... 140239

[52] U.S. Cl. ..... 137/608; 137/561 R; 162/290; 34/160; 239/450

[51] Int. Cl.² ..... F26B 21/12; D21F 5/18

[58] Field of Search ..... 137/561, 608; 239/135, 239/136, 137, 138, 430, 450, 504, 594, 597; 34/34, 155, 160; 162/207, 290

[56] References Cited

UNITED STATES PATENTS

| | | | |
|---|---|---|---|
| 1,144,896 | 6/1915 | Fosbraey | 34/155 X |
| 1,529,562 | 3/1925 | Vezie | 239/139 |
| 2,838,982 | 6/1958 | Dupasquier | 162/290 |
| 3,037,706 | 6/1962 | Dupasquier | 162/207 X |
| 3,242,587 | 3/1966 | Dupasquier | 34/160 X |
| 3,386,659 | 6/1968 | Rea | 239/139 X |
| 3,669,831 | 6/1972 | Dupasquier | 162/290 |
| 3,726,757 | 4/1973 | Dupasquier | 34/155 X |

*Primary Examiner*—William R. Cline
*Attorney, Agent, or Firm*—Fetherstonhaugh and Company

[57] ABSTRACT

A steam supply apparatus includes at least two pipes located in spaced apart, side by side relationship, and a cover member extending across the pipes and secured thereto. End members are secured to the respective opposite ends of the pipes, and a pair of baffles between each pair of pipes are secured thereto in a substantially V-shaped configuration with a slot between adjacent ends of the baffles at the base of the V-shape, the base of the V-shape being directed towards the cover member. Steam is supplied to the pipes, and each pipe has a series of apertures communicating the interior of the pipe with the space between the pipes, the cover member and the baffles.

20 Claims, 5 Drawing Figures

STEAM SUPPLY APPARATUS

Matter enclosed in heavy brackets [ ] appears in the original patent but forms no part of this reissue specification; matter printed in italics indicates the additions made by reissue.

This invention relates to steam supply apparatus.

In some processes, it is desirable to supply steam in a relatively dry state over a relatively long length and width. One example of such a process is in a paper-making machine, in which steam is directed at the paper web from a steam supply apparatus as the paper web passes thereby.

It is therefore an object of the invention to provide an improved steam supply apparatus suitable for this purpose.

According to the invention, at least two pipes are located in spaced apart, side by side relationship, with a cover member extending across the pipes and secured thereto, end members secured to the respective opposite ends of the pipes, a pair of baffles between each pair of pipes and secured thereto in a substantially V-shaped configuration with a slot between adjacent ends of the baffles at the base of the V-shape, the base of the V-shape being directed towards the cover member, and means for supplying steam to the pipes, each pipe having a series of apertures communicating the interior of the pipe with the space between the pipes, the cover member and the baffles.

In use, the apparatus is positioned so that the pipes extend transversely to the direction of motion of the web. Steam supplied to the pipes passes through the apertures into the spaces between the pipes, the baffles and the cover member, and then passes out of the apparatus through the slot between each pair of baffles. Condensation of steam within the apparatus drains to the bottom of the pipes and to the lowermost parts of the baffles, from whence it can be drained by appropriately positioned apertures and drain tubes.

The pipes form a main part of the structure. Preferably, stiffeners are secured at intervals between each pair of pipes, the baffles and the cover member. Also, spacers may be secured between the cover member and the adjacent end portions of the baffles.

The apparatus may be provided with a jacket extending in spaced relationship to the cover member, with insulating material being located in the space between the jacket and the cover member. The jacket preferably extends also over the outer sides of the outer pipes in spaced relationship thereto, with insulation therebetween.

The steam supply means may include a steam supply pipe connected to one end of one pipe, and a connector connecting the opposite end of the pipe to an adjacent pipe. The connector may include an adjustable valve to regulate the flow of steam from the one pipe to the adjacent pipe, or where at least three pipes are provided may include separate adjustable valves to regulate the flow of steam from an inner pipe to outer pipes.

One embodiment of the invention will now be described, by way of example, with reference to the accompanying drawings, of which:

Figure 1:
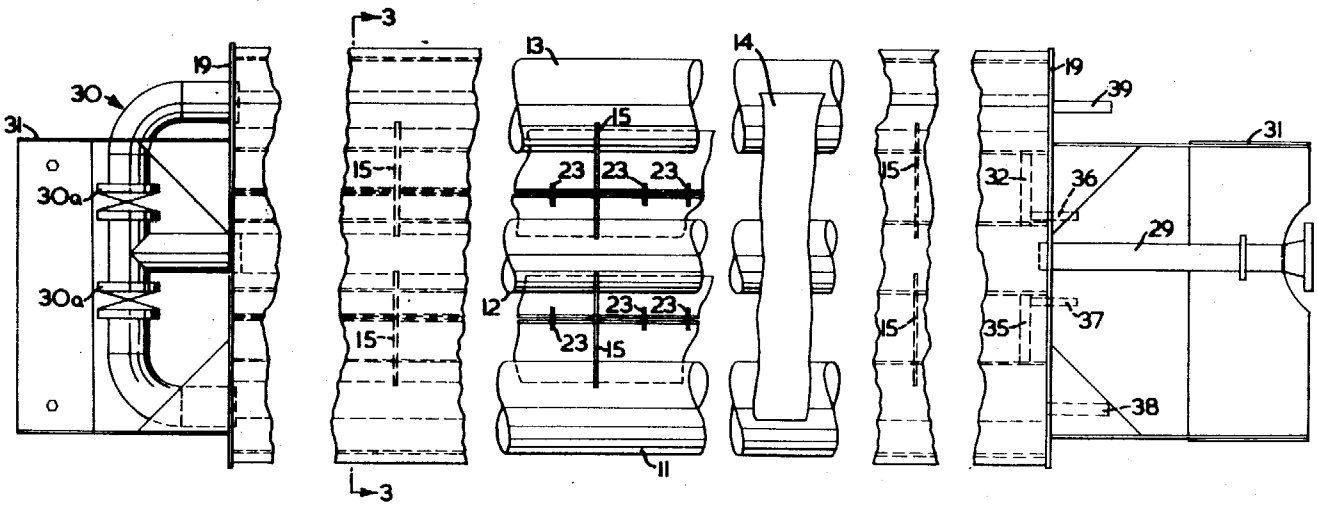
FIG. 1 is a plan view, partly broken away, of the steam supply apparatus.
Figure 2:
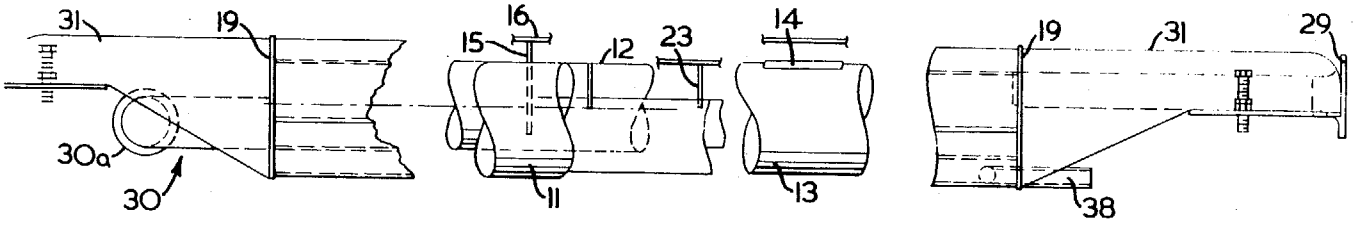
FIG. 2 is a side view of the apparatus.

Referring to the drawings, a steam supply apparatus intended for use in a paper making machine includes three spaced parallel steam header pipes 11, 12, 13, the outer pipes 11, 13 being of greater diameter than the inner pipe 12. The tops of each pipe 11, 12, 13 are welded to the underside of a cover member in the form of a top plate 14.

Three stiffeners 15 are located between and are welded to each adjacent pair of pipes 11, 12, and 12, 13, and each stiffener 15 projects above the top plate 14 through a respective slot therein. A jacket 16 extends across the top plate 14 in spaced relationship therewith, and is secured to the upper edges of the stiffeners 15. The jacket 16 extends downwardly at the side in spaced relationship to the outer pipes 11, 13, and adjacent the bottom of each outer pipe 11, 13 has an inwardly projecting member 17 whose inner end is welded to the respective pipes 11, 13. This member 17 can operate as a low pressure steam seal or a deflector. A spacing bracket 18 extends between and is welded to the outer pipes 11, 13 respectively and the jacket 16. The space between the jacket 16 on the one hand and the top plate 14 and the outer pipes 11, 13 on the other hand is filled with glass fibre for heat insulation purposes. An end plate 19 is welded to each end of the pipes 11, 12, 13, the top plate 14 and the jacket 16.

Between each pair of pipes 11, 12, and 12, 13 is a pair of baffles 20, 21 in inverted V-shaped configuration, the base of the V-shape thus being directed towards the top plate 14. The lower ends of each pair of baffles 20, 21 are welded to the lower adjacent parts of the pipes 11, 12 and 13, 12 respectively, and the upper ends are spaced apart by a small amount to provide a slot 22 between each pair of baffles 20, 21 extending the length of the pipes 11, 12, 13. The slot 22 is maintained by a series of spacers 23 welded at regular intervals to the baffles 20, 21 at the lower ends of the spacers and to the under side of the top plate 14 at the upper ends of the spacers. The baffles 20, 21 are also welded to the lower ends of the stiffeners 15. Both the stiffeners 15 and the spacers 23 have lower edges of inverted V-shape to conform with the inclination of the baffles 20, 21, with the apex of the V-shape being cut away in the stiffeners 15 and spacers 23 and 24 and 25 respectively so as not to unduly interrupt the slots 22.

Each outer pipe 11, 13 has a series of spaced apertures 26 extending along the length of the respective pipes in the upper interior portion thereof. The inner pipe 12 has two series of spaced apertures 27, 28 extending along the length of the pipe 12 on each side of the upper portion thereof.

At one end of the apparatus, a steam supply pipe 29 is secured to one end of the inner pipe 12. At the opposite end, a pipe connector 30 connects the opposite end of the inner pipe 12 to the two outer pipes 11, 13. The pipe connector 30 includes two manually operable valves 30a to regulate the flow of steam individually from the inner pipe 12 to the outer pipes 11 and 13 respectively. Mounting brackets 31 extend outwardly from the end plates 19.

At the steam supply end of the apparatus, a drain tube assembly includes four tubes 32, 33, 34, 35 connected to apertures in the respective baffles 20, 21, and outlet tubes 36, 37 extending from the tubes 32, 33 and 34, 35 respectively through the adjacent end plate 19 to the exterior of the apparatus. Drain tubes 38, 39 extend through the end plate 19 from the outer pipes 11, 13 respectively and a convenient drain is also provided from the central pipe 12.

Figure 3:
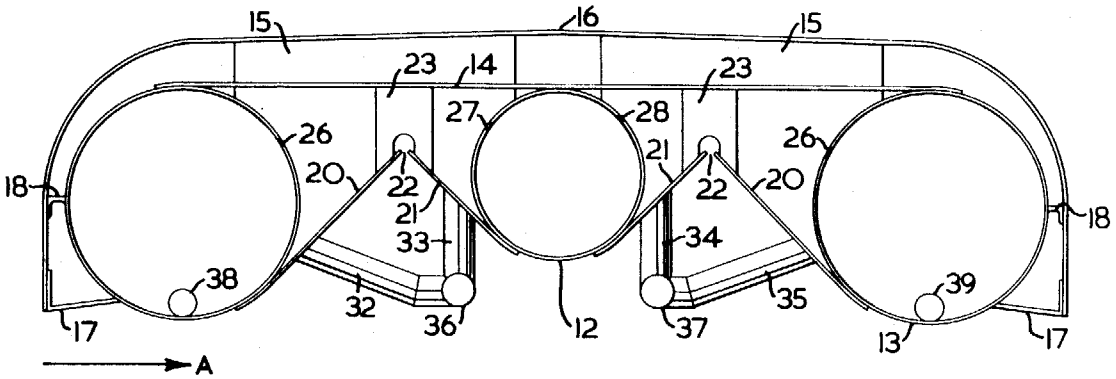
FIG. 3 is a sectional view on an enlarged scale along the line 3—3 of FIG. 1.
Figure 4:
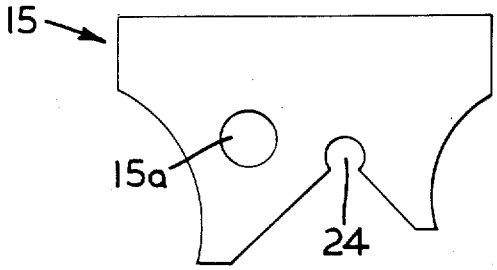
FIG. 4 is a front view, on an enlarged scale, of one of the stiffeners.
Figure 5:
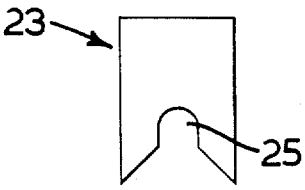
FIG. 5, is a front view on an enlarged scale of one of the spacers.

In use, the apparatus is positioned above the paper web so that the pipes 11, 12, 13 extend transversely to the direction of motion of the web, as indicated by the arrow A in FIG. 3. One or more suction boxes will be arranged in known manner below the web. Steam is supplied through the supply pipe 29 to the inner pipe 12, from which the steam flows through the connector 30 and valve 30a into the two outer pipes 11, 13. Steam escapes from the pipes 11, 12, 13 through the apertures 26, 27, 28 into the spaces between the pipes, and from these spaces the steam passes through the slots 22 out of the apparatus. Condensation remains in the pipes or drains to the lowermost parts of the baffles 20, 21 from whence it drains through the various tubes mentioned above. The whole apparatus will of course be slightly tilted towards the end at which the drain tubes are located so that the condensation will run to the drain tubes.

By operation of the valve 30a, the inner pipe 12 can be used alone, or in combination with either or both outer pipes 11, 13 at the same or lower pressures, thus giving a wide range of distribution of steam to the sheet.

The spacers 15 are preferably provided with apertures 15a to allow equalization of steam pressure along the outside of the length of each pipe 11, 12, 13, that is to say across the width of the web.

In one specific embodiment, the apparatus was about 12 feet in length between the end plates, and 3 feet wide. The inner pipe was about 6 inches in diameters, and the outer pipes about 8 inches in diameter. The apertures 26, 27, 28 were 5/16ths inches in diameter and were located every 4 inches along the length of the respective pipes. The apertures were located on radii of the respective pipes which were inclined at an angle of 20° above the horizontal.

The described embodiment is relatively noise-free compared to known steam supply apparatus used in paper making machines.

Although the described embodiment is for use above a paper web with the steam being directed downwardly, it will be apparent that it is also within the scope of the invention to provide apparatus for use below a paper web with the steam being directed upwardly.

I claim:

1. A steam supply apparatus including at least two pipes located in spaced apart, side by side relationship, a cover member extending across the pipes and secured thereto, end members secured to the respective opposite ends of the pipes, a pair of baffles between each pair of pipes and secured thereto in a substantially V-shaped configuration with a slot between adjacent ends of the baffles, at the base of the V-shape, the base of the V-shape being directed towards the cover member, means for supplying steam to the pipes, and each pipe having a series of apertures communicating the interior of the pipe with the space between the pipes, the cover member and the baffles.

2. Apparatus according to claim 1 wherein condensation drainage means is provided and comprises tubes connected to apertures in the lower parts of the baffles.

3. Apparatus according to claim 1 wherein stiffeners are secured at intervals between each pair of pipes, baffles and the cover member.

4. Apparatus according to claim 1 wherein spacers are secured at intervals to the cover member and the adjacent end portions of the baffles.

5. Apparatus according to claim 1 wherein a jacket member is secured in spaced relationship to the cover member, and insulating material is located in the space between the jacket member and the cover member.

6. Apparatus according to claim 5 wherein the jacket extends on the outer side of the outer pipes in spaced relationship thereto, with insulating material therebetween.

7. Apparatus according to claim 1 wherein the steam supply means includes a steam supply pipe connected to one end of one pipe, and a connector connecting the opposite end of said pipe to an adjacent pipe.

8. Apparatus according to claim 7 wherein the connector includes an adjustable valve to regulate the flow of steam from said one pipe to the adjacent pipe.

9. Apparatus according to claim 7 wherein at least three pipes are provided, and the connector includes separate adjustable valves to regulate the flow of steam from an inner pipe to outer pipes.

*10. Steam supply apparatus comprising at least two pipes located in spaced apart, side by side relationship, a cover member extending between the pipes and extending longitudinally thereof and secured thereto, a bottom wall spaced below said cover member and extending longitudinally of and between and secured to the pipes, said pipes, cover member and bottom wall forming a steam chamber therebetween, end members closing said steam chamber near opposite ends of the pipes, steam outlet means in the bottom wall and extending substantially the length of the chamber between the pipes, and means for supplying steam to the pipes, each pipe having a plurality of apertures therein arranged longitudinally thereof and maintaining the interior of said steam pipe in communication with the steam chamber, and said pipes being adapted to extend across a surface against which steam is to be directed through said outlet means and to support the steam chamber above said surface.*

*11. Apparatus according to claim 10 in which said apertures in each pipe are located above the horizontal diameter thereof.*

*12. Apparatus according to claim 10 including stiffeners extending across the steam chamber and secured to the pipes, the cover member and the bottom wall, said stiffeners being spaced apart and dividing the chamber into sections.*

*13. Apparatus according to claim 12 including opening means in said stiffeners maintaining said chamber sections in communication with each other.*

*14. Apparatus according to claim 10 in which said steam supplying means comprises an inlet pipe connected to one end of one of said pipes, and a connector pipe interconnecting an opposite end of one of said pipes to an adjacent end of the other of said pipes.*

*15. Apparatus according to claim 10 comprising a third pipe spaced laterally from an adjacent one of said first-mentioned pipes, a second cover member and a second bottom wall spaced from each other and secured to and extending longitudinally of said third pipe and said adjacent pipe and forming a second steam chamber therebetween, end members closing said second chamber near opposite ends of the pipes, steam outlet means in said second bottom wall and extending substantially the*

*length of the second chamber, and means for supplying steam to the third pipe, said adjacent pipe and said third pipe having a plurality of apertures therein arranged longitudinally thereof and maintaining the interiors of said adjacent and third pipes in communication with the second steam chamber, and said adjacent and third pipes being adapted to support the second steam chamber above said surface.*

*16. Apparatus according to claim 15 in which said apertures of each of said pipes are located above the horizontal diameter thereof.*

*17. Apparatus according to claim 15 including stiffeners extending across each of said steam chambers and secured to the adjacent pipes, cover members and bottom*

*walls, said stiffeners being spaced apart and dividing the chambers into sections.*

*18. Apparatus according to claim 17 including opening means in said stiffeners maintaining said chamber sections in communication with each other.*

*19. Apparatus according to claim 15 in which said steam supplying means comprises an inlet pipe connected to one end of said adjacent pipe, and connector pipe means interconnecting an opposite end of said adjacent pipe to adjacent ends of the other of said pipes.*

*20. Apparatus according to claim 19 including valve means in said connector pipe means between said adjacent pipe and each of said other of said pipes.*

* * * * *